FIG. I.

United States Patent Office 3,667,867
Patented June 6, 1972

3,667,867
HYDRAULIC APPARATUS
Kenneth Raymond Boydell, Bredons Hardwick, near Tewkesbury, and John Christopher Eglington Flint, Chalford Hill, Stroud, England, assignors to Dowty Technical Developments Limited, Brockhampton Park, Brockhampton, Cheltenham, England
Filed Sept. 19, 1969, Ser. No. 859,297
Claims priority, application Great Britain, Sept. 21, 1968, 44,989/68
Int. Cl. F04b 1/26; F01b 13/04
U.S. Cl. 417—222                                10 Claims

ABSTRACT OF THE DISCLOSURE

A variable-displacement pump or motor including a displacement-varying member on which a restoring force operates to urge it to one displacement limit, a hydraulic servo-cylinder containing a piston and a control unit, the piston being connected to adjust the displacement varying member and the control unit fitting into the servo-cylinder to co-operate with a high pressure port in the servo-cylinder and operating to generate a control pressure in the working space to cause adjustment of the displacement varying member.

---

Figure 1:
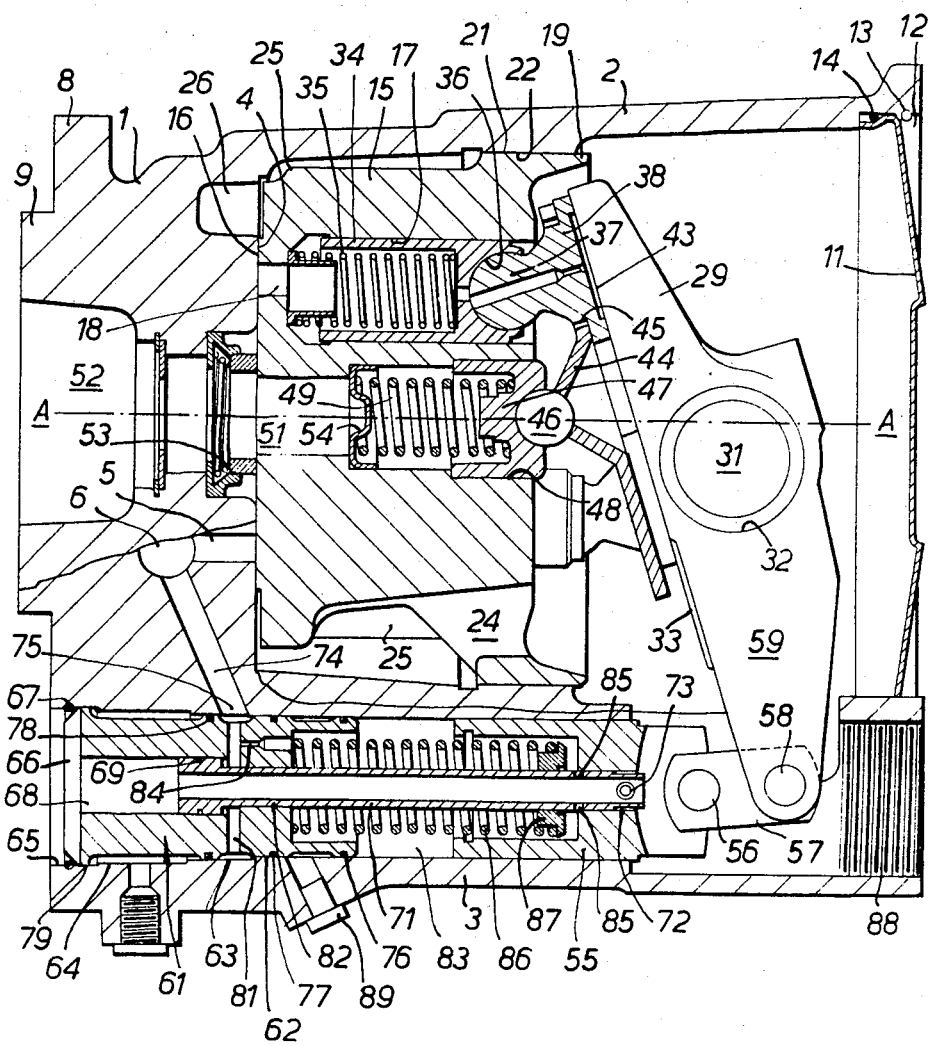

This invention relates to variable displacement hydraulic pumps or motors.

The object of the invention is to produce a variable-displacement pump or motor in which any of a number of automatic displacement control units may be fitted without requiring any substantial variation in structure of the basic pump or motor.

In accordance with the present invention a variable-displacement pump or motor includes, a displacement varying member capable of movement between a minimum displacement limit and a maximum displacement limit, means responsive to the operative hydraulic pressure in the pump or motor to exert a restoring force on the displacement varying member to urge it to one displacement limit, a hydraulic servo cylinder, a hydraulic servo-piston slidable within the cylinder and mechanically connected to the displacement varying member, a control unit mounted in the servo-cylinder or an extension thereof to define a working space between it and the servo-piston in which liquid at pressure urges the servo-piston and the displacement varying member in opposition to the restoring force, and a high pressure port in the servo-cylinder fed with the operative pressure of the pump or motor and connected directly to the control unit which operates to generate a control pressure in the working space.

The control unit may adjust the position of a valve member which extends to the servo-piston from the control unit, the valve member co-operating with the servo-piston to adjust pressure in the working space in the sense to cause the servo-piston to move to a predetermined position relative to the valve member.

The valve member may include a pressure sensing piston mounted within a cylinder in the control unit and subjected to the operative pressure from the said port and a spring may be arranged to oppose the sensing piston force whereby movement of the valve member is in accordance with the operative pressure, the resulting movement of the servo-piston being such that increase in operative pressure causes reduction of displacement and vice versa.

Alternatively, the valve member may include a pressure difference sensing piston mounted within a cylinder in the control unit to provide two opposed control unit working spaces, one of which is fed with the operative pressure from said port and the other of which is fed with a control pressure from a restrictor carrying liquid at the operative pressure to or from the pump or motor whereby the sensing piston is subjected to a pressure difference which depends on the flow rate of liquid to or from the pump or motor, a spring acting between the valve and the servo-piston whereby the displacement varying member is adjusted in the sense to tend to maintain constant the pressure difference across the sensing piston, which in turn will tend to maintain constant the flow to or from the pump or motor.

Again alternatively the valve member may include a pressure sensing piston mounted within a cylinder in the control unit and subject to the operative pressure from said port and a spring may be arranged to act between the servo-piston and the valve member to oppose the servo-piston force whereby movement of the valve member is in accordance with the operating pressure, the resulting movement of the servo-piston being such that variation in operative pressure causes movement of the servo-piston to vary displacement in the sense to tend to keep the operative pressure constant.

A fixed restrictor in the control unit may be arranged to connect the port in the servo-cylinder into the servo-cylinder working space and the valve member may co-operate with the servo-piston to form a variable restrictor to control flow of liquid from the working space through the servo-piston to a low pressure zone whereby the pressure in the working space is determined by the liquid flow through the fixed restrictor permitted by the variable restrictor formed by the valve member and the servo-piston.

Figure 2:
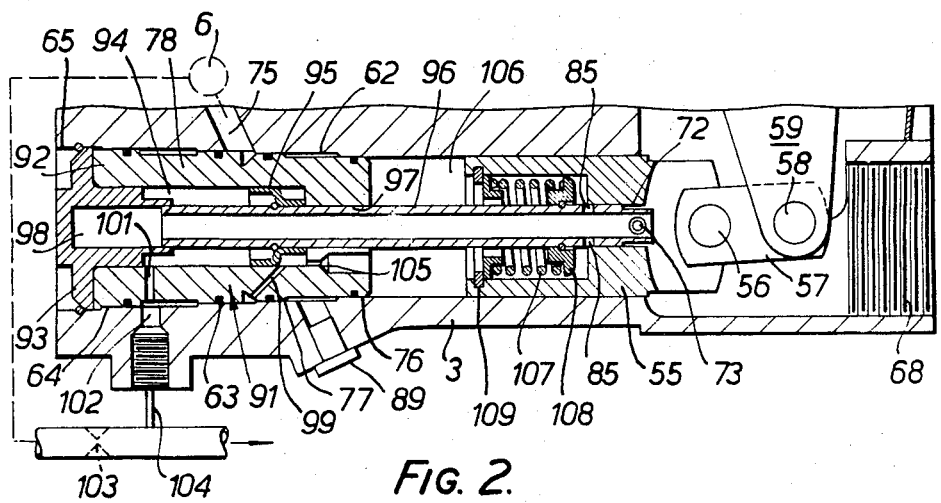
Figure 3:
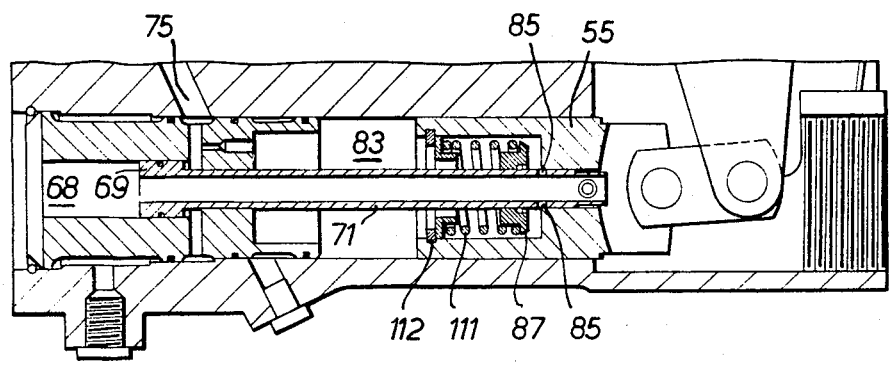

Three embodiments of the invention will now be particularly described with reference to the accompanying drawings in which, FIG. 1 is a longitudinal cross-section through the first embodiment, FIG. 2 is a longitudinal cross-section through a modified control unit for use in FIG. 1, and FIG. 3 is a longitudinal cross-section through a further modified control unit also for use in FIG. 1.

The embodiment of the invention shown in FIG. 1 comprises a swash plate pump and its associated servo control. The swash plate pump is identical with the swash plate pump disclosed in K. R. Boydell's Patent 3,647,321 issued Mar. 7, 1972. A single structural member or support is provided by an aluminium alloy casting which comprises the valve 1, the casing 2 and the servo-cylinder 3. The valve 1 has a flat valve surface 4 which contains a high pressure delivery port 5 of conventional kidney-shape connected to a delivery passage 6 which terminates as a screw-threaded connection on the outside of the valve 1. A plurality of mounting lugs 8 are provided around the periphery of the valve 1 for securing the pump in its operative position, the pump being correctly located by a cylindrical boss 9 adapted to fit a corresponding hole on a driving motor or engine. The casing 2 is closed at the end remote from the valve 1 by means of a cover 11 of pressed sheet metal secured in a large circular recess 12 by means of a circlip 13. A rubber seal 14 ensures liquid tight connection.

In the casing 2 a cylinder block 15 of cast iron is located for rotation about the axis A—A. The cylinder block 15 includes a flat valve surface 16 resting on the valve surface 4. Within the block there are five regularly spaced cylinders 17 all of those axes are parallel to the rotation axis A—A of the block. Each cylinder 17 includes a port 18 opening into the surface 16, the ports 18 being arranged to co-operate with the main pressure port 5 during rotation of the cylinder block 15. At a position remote from the surface 16 the cylinder block includes an integrally formed skirt 19 which carries a cylindrical bearing surface 21. Within the casing 2 adjacent to the bearing surface 21 an internal cylindrical bearing surface 22 is formed which engages the bearing surface 21 to locate the block for rotation.

Five passages 24 are formed in the cylinder block one between each adjacent pair of cylinders. Each passage opens from the surface of the block remote from the valve surface 4 between paddles or vanes 25 formed on the cylinder block 15 within the casing 2. A recess 26 is formed in the above surface 4, the inner portion of this recess co-operating with the cylinder ports 18 and at a position (not shown) forming an inlet port. The outer end of this recess opens into the spaces between the vanes 25.

The casing 2 remote from the valve includes a pair of integrally formed bosses bored transversely to produce a pair of spaced apertures and between the bosses a swash plate 29 is mounted on a shaft 31 by means of a cylindrical bore 32 extending through the swash plate. The swash plate includes a flat swash surface 33 facing the cylinder block 15. The axis of shaft 31 is off-set from axis A—A to provide a restoring force as described later in this specification.

Within each cylinder 17 a piston 34 and a compression spring 35 are located, the spring acting to urge the piston outwardly from the cylinder. At its outer end each piston 34 is formed with a spherical socket 36 into which a ball 37 is secured. The ball 37 is integrally connected to a slipper 38 engaging the swash surface 33. A hydraulic passage through each piston 34, ball 37 and slipper 38 carries liquid at pressure from the cylinder to lubricate the ball 37 and to feed liquid at pressure to a recess 43 in the slipper surface. The recess is conventionally arranged so that hydraulic pressure acting in the recess will almost completely balance the hydraulic load acting on the piston.

A retaining plate 44 includes five apertures 45 engaged one on each slipper 38. Centrally the retaining plate 44 reacts against a ball 46 carried by a pad 47 slidably mounted in a central bore 48 in the cylinder block, a compression spring 49 reacting between the block 15 and the pad 47 and serving simultaneously to urge the block on to the valve surface 4 and also to urge the retaining plate 44 to maintain the slippers in contact with the swash surface. The force exerted on the swash plate by springs 35 and hydraulic pressure through the pistons, and the force exerted by spring 49 tends to urge the swash plate about the axis of shaft 31 to reduce pump displacement to a minimum limit.

A splined aperture 51 is provided centrally within the cylinder block to open to a comparatively large aperture 52 extending through the valve 1. A drive shaft (not shown) may be inserted through the aperture 52 to engage the splined aperture 51 to drive the cylinder block. A seal 53 may engage between the valve and the cylinder block in the manner disclosed in our co-pending application No. 838,607. To prevent hydraulic leakage between the bore 48 and the aperture 52 the bore 48 is closed by means of a plug 54.

The servo-cylinder 3 has a servo-piston 55 slidably mounted therein one end being connected by means of a pivotal pin 56 to a link 57 which in turn is connected by a pivotal pin 58 to a lever 59 extending from the swash plate 29. In the drawing the swash plate is shown at a position corresponding to maximum inclination which in turn corresponds to maximum hydraulic displacement per revolution of the pump.

The control unit 61 is located within an extension of the servo-cylinder 3 at the side of the valve 1. This extension is formed in four portions 62, 63, 64 and 65 of circular section but of successively increasing diameter. A head portion 66 of the control unit is secured in the extension portion 65 of the servo-cylinder by means of a circlip. Within the control unit a centrally located bore 68 is provided which encloses a pressure sensing piston 69. From the piston 69 and valve member 71 in the form of a hollow rod extends to the servo-piston 55, the end thereof being located in a bore 72 in the servo-piston. The valve member then serves to connect the interior of the casing 2 which is maintained at low pressure to the left-hand end of the cylinder 68. The valve member is secured within the servo-piston 55 by means of a pin 73 extending transversely through the piston and loosely through a hole in the valve member permitting a limited amount of lost motion of the valve member in the bore 72.

In the manufacture of the integral casing and valve a passage 74 is bored obliquely through the extension of the servo-cylinder 3 and into the valve to intersect the delivery passage 6. The outer end of the passage 74 intersects the bore portion 62 and the inner portion of the passage 74 intersects at the bore portion 63 and this interconnection forms the high pressure port 75 opening into the servo-cylinder bore. The control unit is formed with four spaced lands 76, 77, 78 and 79. Each of these lands with the exception of land 79 includes a seal, land 76 sealing in the bore 3, land 77 sealing in bore portion 62, land 78 sealing in bore portion 63 and land 79 fitting into bore portion 65. The port 75 is thus located to enter at the bore portion 63 between the lands 77 and 78. At this position the control unit is provided with a transverse hole 81 which connects with a waisted portion of the control unit intermediate to the lands 77 and 78 and connects to the right-hand end of the bore 68 in the control unit. The rod 71 extends to the right from piston 69 through a closely fitting bore 82 in the control unit so that there is little or no leakage from passage 81 through bore 82.

The space in servo-cylinder 3 between control unit 61 and servo-piston 55 forms a hydraulic working space 83 and liquid at pressure may enter this space from the bore 81 through a fixed restrictor 84. Liquid may leave the working space 83 through a pair of ports 85 in the rod 71 so positioned as to be closed to a variable extent depending on the relative position between the rod 71 and the servo-piston 55. Liquid flowing through the ports 85 will enter the low pressure zone in the casing 2. Within the working space 83 a long compression spring 86 surrounds the rod 71, the spring reacting at one end on the control unit 61 and at the other end on a cap 87 secured to the rod 71. Both the control unit 61 and the servo-piston 55 are suitably recessed to accommodate the length of the spring.

The casing 2 includes a screw-threaded connection 88 coaxially disposed relative to the servo-cylinder 3 by which liquid may enter into the casing 2, such liquid being at low pressure and maintaining the interior of the casing at low pressure.

For operation the hydraulic pump illustrated is connected into a hydraulic circuit, low pressure liquid entering the connection 88 and high pressure liquid being delivered from the passage 6 to a suitable hydraulic load. A rotary drive shaft is inserted into the pump to engage the splined hole 51 and rotate the cylinder block. Liquid will be drawn into the casing 2 through connection 88, such liquid flowing over the swash plate and entering through passages 24 whence it enters the cylinders through recess 26. The liquid is then compressed within the cylinders by the pistons 34 and delivered as high pressure liquid at the port 5 to leave through the high pressure delivery passage 6. The high pressure liquid will also flow through passage 74 to port 75 of the servo-cylinder, such liquid at pressure acting on the annular area of the piston 69 exposed over and above the circular cross-sectional area of the rod 71 to urge the piston and the rod to the left as seen in the drawing to cause compression of spring 86. High pressure liquid from port 75 will also flow through the restrictor 84 into the working space 83 and will leave the sapce 83 through the ports 85, the rate of flow being determined by the over-lap permitted between the ports 85 and the edge of the servo-piston 55. Assume now that the load driven by the pump alters to require increased hydraulic pressure. The increased pressure will react on the annular area of piston 69 to urge this piston and control rod 71 to the left as seen in FIG. 1 to cause further compression of spring 86 and increased opening of ports 85. The increase in ports 85 will permit a greater flow of liquid from the working space 83 which by virtue of fixed restrictor 84 will cause a drop in working space pressure. At the same time the increased delivery pressure will cause a greater restoring torque to be exerted on the swash plate 29 to reduce the angle of the swash plate. The servo-piston 55 will therefore move to the left to an extent to cause partial closure of ports 85 such that the pressure developed in the working space 83 causes a force on the servo-piston 55 which exactly balances the restoring torque exerted on the swash plate 29 by the pistons 34 and the springs 35 and 49. At this position the pump will have reduced displacement commensurate with the increased pressure. The spring 86 illustrated is a conventional compression spring of constant rate and the effect produced is that in which the product of pressure and pump displacement will remain approximately constant. In turn this means that the driving torque required for the pump will also remain approximately constant. If the driving torque is required to remain more accurately constant the spring 86 is so constructed as to have a non-uniform rate which will ensure that the product of pressure and displacement remains substantially constant. This result may be achieved in the spring 86 by providing a varying interturn spacing between the convolutions at different positions so that as the total length of the spring is reduced the convolutions progressively close together causing the spring rate to increase with reduction of spring length. The outer end of the passage 74 performs no useful purpose during operation and may be closed by a simple plug 89.

Reference is now made to the embodiment shown in FIG. 2 and similar reference numerals will be used to refer to similar parts appearing in FIG. 1. In particular the servo-cylinder, its enlarged portions 62, 63, 64 and 65, the passage 74 and the port 75 are as exactly as described in FIG. 1. The control unit 91 fits into the extension of the servo-cylinder 3 and includes five lands of which the lands 76, 77 and 78 are arranged as shown in FIG. 1. A further land 92 engages the bore portion 64 and a separable end cap 93 forms the fifth land which engages in the bore portion 65. All lands other than the cap 93 include seals to engage their respective bore portions. As previously described the high pressure port 75 opens into the bore portion 63. Within the control unit a bore 94 is provided within which a piston 95 is slidable, the piston being mounted on a hollow rod 96 which extends through a closely fitting bore 97 in the right hand end of the control unit and which extends into a close fitting closed bore 98 in the end cap 93. The waisted portion of the control unit between lands 77 and 78 is connected by means of a passage 99 with the right-hand end of bore 94. The left-hand end of bore 94 is connected by a passage 101 to the waisted part between lands 78 and 92 to make connection to a port 102 which connects to a screw-threaded connection in the casing. The delivery flow from the delivery passage 6 to the load is arranged to pass through a simple restrictor 103 formed as an external unit attached to the pump and downstream of the restrictor 103 a pipe 104 connects into the port 102 through the screw-threaded connection. A fixed restrictor 105 in the control unit extends from the righthand end of bore 94 to connect high pressure liquid into the working space 106 between the control unit and the servo-piston.

The hollow rod extends from the control unit through working space 106 into a closely fitting bore 72 in the servo-piston, a pair of ports 85 controlling the flow of liquid from working space 106 through the hollow rod 96 into the casing 2. A cross pin 73 in the servo-piston provides lost motion of the hollow rod 96. A compression spring 107 is disposed around the hollow rod 96 and acts between an end cap 108 on the rod and a stop 109 in the piston 55, the spring being entirely contained within a hollow space within the piston.

In operation when the pump is hydraulically and mechanically connected, liquid flowing from the delivery passage 6 to the load will pass through the fixed restrictor 103 and the two ends of the cylinder 94 will receive the two pressures appearing on either side of the restrictor 103 so that a force is generated on the piston 95 dependent on the pressure loss at restrictor 103. This force will react against the compression spring 107 to move the rod 96 within the servo-piston to vary the opening permitted at the ports 85. Liquid at delivery pressure from the port 75 enters the working space 106 through fixed restrictor 105 and leaves through the ports 85, the pressure in the working space then being determined by the opening permitted at the ports 85. An excessive flow rate delivered by the pump will cause an excessive pressure drop at restrictor 103 which will move the hollow rod against its spring 107 to maintain a large opening at ports 85 thereby reducing the pressure in the working space 106 such that the restoring force acting on the swash plate will move the piston to a smaller displacement position until such time as the correct pressure drop occurs across restrictor 103 when the ports 85 will be adjusted for the correct opening to maintain a pressure in working space 106 to balance the restoring force of the swash plate. In this way the delivery flow rate from the pump is maintained substantially constant.

Reference is now made to FIG. 3 of the drawings and again similar reference numerals will refer to similar parts appearing in FIG. 1. The structure of FIG. 3 is almost identical with the structure in FIG. 1 the sole difference being that the long spring 86 of FIG. 1 is not used but is substituted by a shorter spring 111 which reacts between the end cap 87 carried by the hollow rod 71 and a stop 112 within the servo-piston 55, the spring then being substantially entirely contained within the hollow space within the servo-piston.

When hydraulically and mechanically connected for operation the pump will deliver liquid at pressure to delivery passage 6 and to the port 75 which will then have access to the right-hand end of cylinder 68 to act on an annular area of piston 69. The force generated on piston 69 will cause a certain compression of the spring 111 which will determine a particular opening for the ports 75 and will thus determine the operating pressure within the working space 83 and the servo-piston will move to increase displacement according as to whether the pressure in working space 83 is greater than or less than a particular value. The adjustment of the servo-piston will alter displacement which will in turn alter pressure towards a required value and at this required value the pressure within the working space (which must be lower than the required value) will exert a force on the servo-piston 55 which will exactly balance the force exerted by the self-restoring torque on the swash plate. Thus the FIG. 3 embodiment will ensure substantially constant delivery pressure from the pump irrespective of flow rate or pump rotational speed.

In the three described embodiments the restoring force on the swash plate is obtained merely by off-setting the axis of the trunnion shaft 31 relative to the rotation axis A—A of the cylinder block. It is however within the scope of the present invention to provide other means of providing the restoring force on the swash plate, for example a simple piston-and-cylinder device fed with liquid at delivery pressure could act on the swash plate constantly in opposition to the force generated by servo-piston 55.

The three described embodiments all relate to hydraulic pumps but the invention equally relates to hydraulic motors. In the case of a hydraulic motor the operative pressure is the pressure of liquid supplied to the motor and this would be the pressure connected to the port in the servo-cylinder for direct connection to the control unit. If the FIG. 1 arrangement were a motor the control would be effective to provide a substantially constant driving torque irrespective of speed. If the FIG. 2 arrangement were for a motor the effect of the control would be to ensure a constant flow rate of liquid to the motor irrespective of motor speed or operating torque. If the FIG. 3 arrangement were for a motor the control unit would ensure that the supply pressure for the motor would remain at a constant pressure irrespectively of the operating speed and torque of the motor.

The illustrated pump is of simple construction and it may be easily fitted with any of the described control units to obtain the automatic control functions of the unit without structural modification of the pump or increase in its overall dimensions.

In the broad sense the invention is applicable to any kind of variable-displacement pump or motor.

We claim:

1. A variable-displacement pump or motor device including a displacement varying member capable of movement between a minimum displacement limit and a maximum displacement limit, means responsive to the operative hydraulic pressure in said device to exert a restoring force on the displacement varying member to urge it to one displacement limit, a hydraulic servo-cylinder, a hydraulic servo-piston slidable within the cylinder and mechanically connected to the displacement varying member, a control unit mounted in the servo-cylinder or an extension thereof to define a working space between it and the servo-piston in which liquid at pressure urges the servo-piston and the displacement varying member in opposition to the restoring force, a high pressure port in the servo-cylinder fed with the operative pressure of said device and connecting directly to the control unit which operates to generate a control pressure in the working space, a valve member adjustable by the control unit and extending to the servo-piston from the control unit, the valve member cooperating with the servo-piston to adjust pressure in the working space in the sense to cause the servo-piston to move to a predetermined position relative to the valve member, the valve member including a pressure difference sensing piston mounted within a cylinder in the control unit to provide two opposed control unit working spaces, one of which is fed with the operative pressure from said port and the other is fed with a control pressure from a restrictor carrying liquid at the operative pressure to or from said device whereby the sensing piston is subjected to a pressure difference which depends on the flow rate of liquid to or from said device, a spring acting between the valve and the servo-piston whereby the displacement varying member is adjusted in the sense to tend to maintain constant the pressure difference across the sensing piston, which in turn will tend to maintain constant the flow to or from said device.

2. A variable-displacement pump or motor device including a displacement varying member capable of movement between a minimum displacement limit and a maximum displacement limit, means responsive to the operative hydraulic pressure in said device to exert a restoring force on the displacement varying member to urge it to one displacement limit, a hydraulic servo-cylinder, a hydraulic servo-piston slidable within the cylinder and mechanically connected to the displacement varying member, a control unit mounted in the servo-cylinder or an extension thereof to define a working space between it and the servo-piston in which liquid at pressure urges the servo-piston and the displacement varying member in opposition to the restoring force, a high pressure port in the servo-cylinder fed with the operative pressure of said device, a restricted fluid passageway between said high pressure port and said working space, a restricted fluid passageway through which fluid from said working space discharges to a low pressure region whereby the pressure in said working space is lower than the pressure in said high pressure port but higher than the pressure in said low pressure region, the pressure of said high pressure port acting directly on the control unit to regulate said pressure in said working space, and a member movable under the influence of the pressure of said high pressure port to regulate the size of the last-named said restricted passageway, said member comprising a piston responsive to the pressure of high pressure port to move said last-mentioned restricted passageway relative to said servo-postion whereby said servo-piston variably obturates said last-mentioned restricted passageway.

3. A variable-displacement pump or motor device including a displacement varying member capable of movement between a minimum displacement limit and a maximum displacement limit, means responsive to the operative hydraulic pressure in said device to exert a restoring force on the displacement varying member to urge it to one displacement limit, a hydraulic servo-cylinder, a hydraulic servo-piston slidable within the cylinder and mechanically connected to the displacement varying member, a control unit mounted in the servo-cylinder or an extension thereof to define a working space between it and the servo-piston in which liquid at pressure urges the servo-piston and the displacement varying member in opposition to the restoring force, a high pressure port in the servo-cylinder fed with the operative pressure of said device and connecting directly to the control unit which operates to generate a control pressure in the working space, the control unit comprising a block which is a sliding fit in the servo-cylinder, said block having a pair of spaced lands thereon that define between them a groove that communicates with said high pressure port, said groove communicating with said working space through a restrictor, releasable holding means for holding the block stationary in the cylinder during operation and which upon release permit the block to be slid out of the cylinder, lost-motion means interconnecting the block and the piston, and means responsive to a condition of said device for defining an outlet from said working space.

4. A variable-displacement pump or motor device as claimed in claim 3 including a valve member adjustable by the control unit and extending to the servo-piston from the control unit, the valve member cooperating with the servo-piston to adjust pressure in the working space in the sense to cause the servo-piston to move to a predetermined position relative to the valve member.

5. A variable-displacement pump or motor device as claimed in claim 4 wherein the valve member includes a pressure sensing piston mounted within a cylinder in the control unit and subjected to the operative pressure from the said port, and a spring arranged to oppose the sensing piston force whereby movement of the valve member is in accordance with the operative pressure, and the resulting movement of the servo-piston is such that increase in operative pressure causes reduction of displacement and vice versa.

6. A variable displacement pump or motor device as claimed in claim 5 wherein the spring is arranged to react between the control unit and the valve member such that increasing operative pressure will cause increasing movement of the valve member to compress the spring and thus to cause reduction of displacement selected by the servo piston.

7. A variable-displacement pump device as claimed in claim 4 wherein the valve member includes a pressure sensing piston mounted within a cylinder in the control unit and subjected to the operative pressure from said port and a spring arranged to act between the servo-piston and the valve member to oppose the sensing piston force whereby movement of the valve member is in accordance with the operating pressure, the resulting movement of the servo-piston being such that variation in opeartive pressure causes movement of the servo-piston to vary displacement in the sense to tend to maintain the operative pressure constant.

8. A variable-displacement pump or motor device as claimed in claim 4 including a fixed restrictor in the control unit arranged to connect the said port to the servo-cylinder working space and wherein the valve member co-operates with the servo-piston to form a variable restrictor to control flow from the working space through the servo-piston to a low pressure zone whereby the pressure in the working space is determined by the liquid flow through the fixed restrictor permitted by the valve member and the piston.

9. A variable-displacement pump or motor device as claimed in claim 8 including a casing enclosing said mechanism and the servo-cylinder opens into the casing, the casing including a low pressure conneciton to maintain the interior thereof at low pressure, the opening of the servo-cylinder into the casing being such as to maintain low pressure at the side of the servo-piston remote from the working space.

10. A variable-displacement pump device as claimed in claim 7 wherein the low pressure connection to the casing forms the pump inlet connection.

References Cited

UNITED STATES PATENTS

| | | | |
|---|---|---|---|
| 2,564,263 | 8/1951 | Ifield | 91—453 |
| 2,835,228 | 5/1958 | Parr et al. | 417—222 |
| 3,017,750 | 1/1962 | Kempson | 417—218 |
| 3,266,434 | 8/1966 | McAlvay | 417—222 |
| 2,284,897 | 6/1942 | Harrington | 417—218 |
| 2,129,828 | 9/1938 | Dunn | 91—475 |
| 2,882,863 | 4/1959 | Newton | 417—212 |
| 3,051,092 | 8/1962 | Lambeck | 417—219 |
| 3,250,227 | 5/1966 | Kauns | 91—506 |
| 2,931,176 | 4/1960 | Bloch et al. | 417—218 |
| 3,296,797 | 1/1967 | Tlustly | 417—218 |
| 3,512,178 | 5/1970 | Russell | 417—213 |
| 3,589,837 | 6/1971 | Boydell | 91—506 |

FOREIGN PATENTS

| | | | |
|---|---|---|---|
| 1,264,015 | 5/1961 | France | 417—222 |
| 598,124 | 2/1948 | Great Britain | 417—222 |
| 1,008,089 | 10/1965 | Great Britain | 417—218 |

WILLIAM L. FREEH, Primary Examiner

U.S. Cl. X.R.

91—506